F. B. HEITMAN.
DRIVING AND STEERING GEAR.
APPLICATION FILED JUNE 23, 1910.
1,056,672.
Patented Mar. 18, 1913.
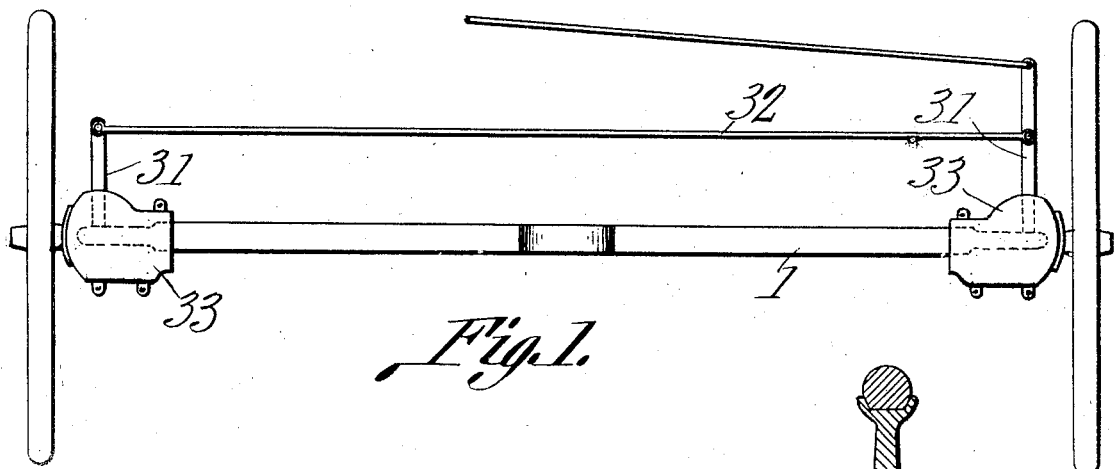
Fig. 1.
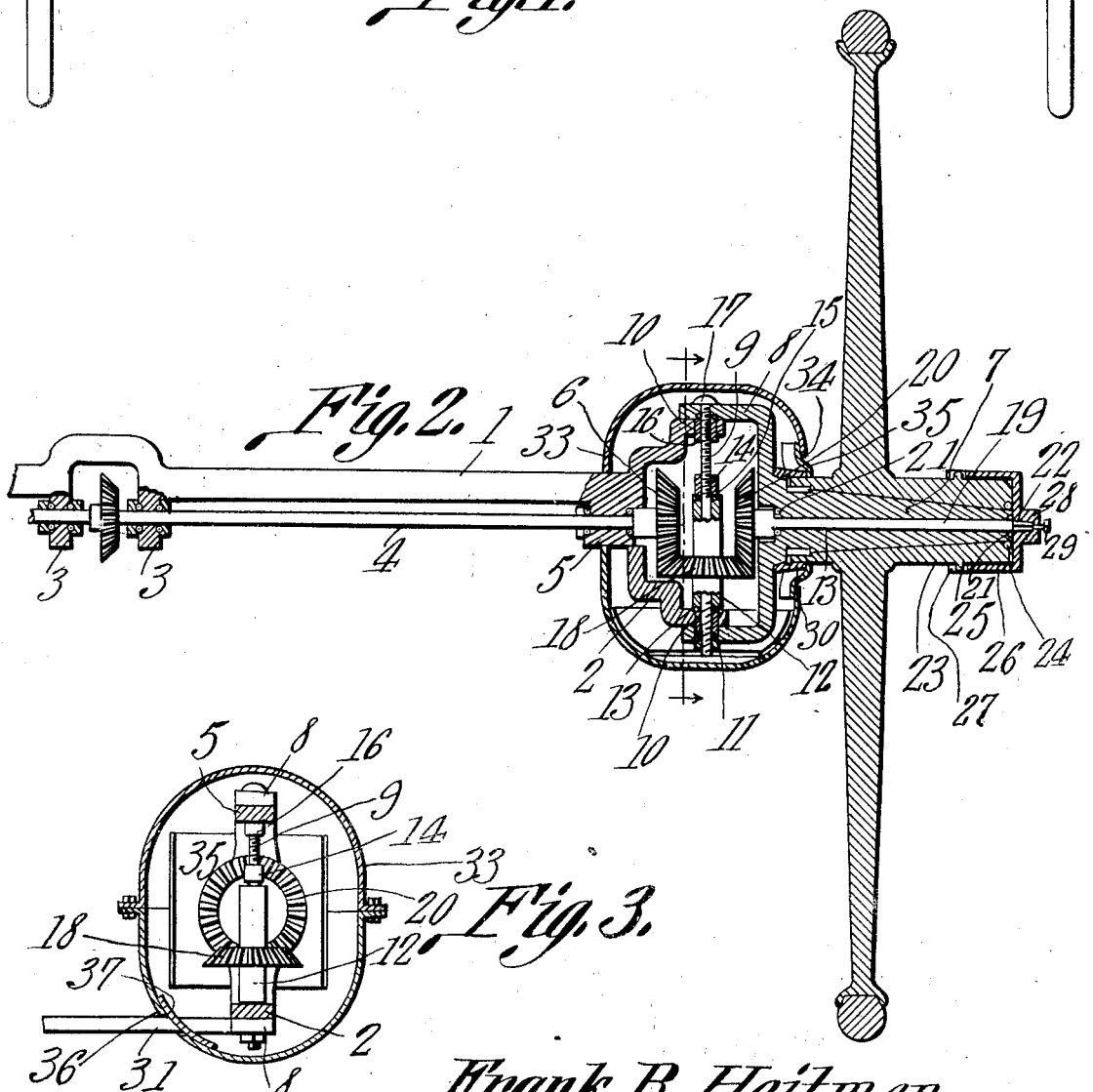
Fig. 2.
Fig. 3.
Frank B. Heitman, Inventor
Witnesses
by C. A. Snow & Co., Attorneys

UNITED STATES PATENT OFFICE.

FRANK B. HEITMAN, OF HUNTINGBURG, INDIANA.

DRIVING AND STEERING GEAR.

1,056,672.

Specification of Letters Patent.  Patented Mar. 18, 1913.

Application filed June 23, 1910. Serial No. 568,569.

*To all whom it may concern:*

Be it known that I, FRANK B. HEITMAN, a citizen of the United States, residing at Huntingburg, in the county of Dubois and State of Indiana, have invented a new and useful Driving and Steering Gear, of which the following is a specification.

This invention has relation to driving and steering gears especially adapted to be used on automobiles and it consists in the novel construction and arrangement of its parts hereinafter shown, described and claimed.

The object of the invention is to provide a combined driving and steering gear which may be applied to either the front or rear axle of an automobile frame and which is of simple and durable structure, the parts being so arranged that the power is transmitted in a direct and advantageous manner from the driving axle to the driving wheel.

In the accompanying drawings,—Figure 1 is a top plan view of the combined driving and steering gear. Fig. 2 is a vertical sectional view of the driving and steering gear. Fig. 3 is a transverse sectional view of the same.

The combined driving and steering gear includes an axle 1 having yokes 2 formed at its ends. Bearings 3 are provided at the underside of the intermediate portion of the axle 1 and a shaft 4 is journaled in the bearing 3 and in bearings 5 provided in the vicinity of the yokes 2. Beveled pinions 6 are fixed to the end portions of the shaft 4 and are located between the branches of the yoke 2.

Stub axles 7 are provided at their inner ends with yokes 8, the branches of which receive between them the branches of the yokes 2. A pivot bolt 9 passes transversely through the upper and lower branches of the yokes 2 and 8 and the said pivot bolt 9 is fixed with relation to the yoke 8. A thimble 10 surrounds the lower portion of each bolt 9 and is located within the lower branch of the yoke 2. At its lower end the said thimble rests upon a ball bearing 11 provided in the lower branch of the yoke 8, and a hub 12 is journaled upon the intermediate portion of the bolt 9 above the upper end of the thimble 10. A ball bearing 13 is interposed between the lower end of the hub 12 and the upper end of the thimble 10. A thimble 14 is adjustably mounted upon the intermediate portion of the bolt 9 above the upper end of the hub 12 and a ball bearing 15 is interposed between the lower end of the thimble 14 and the upper end of the hub 12. A thimble 16 is adjustably mounted upon the upper portion of the pin 9 and at its upper end bears against a ball bearing 17 provided in the upper branch of the yoke 8. A beveled pinion 18 is fixed or made a part of the hub 12 and meshes with the lower portion of the beveled pinion 6.

A stub shaft 19 is journaled for rotation in the stub axle 7 and is provided at its inner ends with a beveled pinion 20 which, at its lower portion meshes with the outer portion of the beveled pinion 18 hereinbefore described. Anti-friction bearings 21 are provided between the stub shaft 19 and stub axle 7 whereby the said stub shaft may freely rotate within the said axle. The outer end portion of the stub shaft 19 is tapered and squared in transverse section as at 22.

A wheel hub 23 is journaled upon each of the stub axles 7 and anti-friction bearings 24 are interposed between the said stub axles and the said wheel hubs. Outwardly projecting lugs 25 are mounted upon the wheel hubs 23 and a cap 26 fits snugly over the outer end of each wheel hub and is provided at its inner end with recesses 27 which receive the said lugs 25 whereby the said wheel hub is constrained to rotate in unison with the said cap. The cap 26 is provided at its center with a boss having a non-circular opening therein adapted to snugly receive the squared and tapered extremity of the stub shaft 19. A set screw 29 passes through the outer end portion of the boss 28 and engages the outer end of the stub shaft 19 and is adapted to hold the cap in close contact with the outer end of the said stub shaft. A sand band 30 is located upon the outer side of the intermediate portion of the yoke 8 and is adapted to receive the inner end portion of the wheel hub 23. An arm 31 is fixed to the lower branch of the yoke 8 and is disposed at a right angle to the vertical plane of the said yoke extending through the axis of the stub shaft 19. The arm 31 at one end of the axle 1 is operatively connected with the arm 31 at the other end thereof by means of a rod 32 which is pivotally connected at its ends with the said arms 31 at the opposite ends of the axle 1. Any suitable means may be provided for swinging one or the other of the arms 31.

A casing 33 consisting of upper and lower halves or castings incloses each knuckle joint of which the yokes 2 and 8 and pivot pin 9 and adjacent members form component parts. Each casing is provided with an elongated horizontally disposed opening 34 through which the stub axle 7 projects and each stub axle is provided with a series of wings or shields 35 which are adapted to move along the opening 34 as the axle 7 is moved along the said opening and keeps the opening closed to prevent the admission of dust, grit, etc. Each casing 33 is also provided with a horizontally disposed elongated opening 36 and the arm 31 passes through said opening. The arm 31 is also provided with wings or fenders 37 which are adapted to move along the said opening 36 as the arm moves along the same and prevents the admission of dust, grit, etc. From this arrangement it will be seen that when it is desired to have access to the parts of the driving and steering gear, the upper section or half of the casing 33 may be removed when the parts within the yokes 2 and 8 will be exposed to view. Also it will be seen that by removing the set screw 29 that the cap 26 may be slipped off of the end of the hub 23 and thus the said hub may be readily removed from the stub axle 7. It will also be seen that as one of the arms 31 is turned in either direction horizontally the other arm 31 is turned correspondingly through the connecting rod 32 and that as the said arm 31 is turned in the manner as indicated, the yoke 8 together with the pivot bolt 9 will be turned so that the stub axles 7 are turned and the device is steered. As the parts wear the sleeve 11 may be shifted along the pivot bolt 9 in order that the hub 12 may be properly positioned against the anti-friction bearings 13 and the beveled pinion 18 is held in proper mesh with the beveled pinions 6 and 20.

Any suitable means may be provided for driving the shaft 4 but as such means are common expedients it is thought unnecessary to include the same in the present showing. Again it will be observed that the arms 31 are connected directly with the yokes 8 and thus as the said arms are swung in the manner as indicated and the yokes are turned the pivot bolts 9 are turned through the instrumentality of the yokes and the yokes are not turned by means of first turning the said pivot pins as is a common practice at present. Thus the said pivot bolts are relieved of unnecessary strain and wear incident thereto is materially reduced. Furthermore this leaves the entire intermediate portion of the pivot bolt unobstructed and a much longer hub 12 for the support of a beveled pinion 18 may be positioned thereon and still room is provided for the proper adjustment of the parts. Therefore while a compact assemblage is effected the parts are not necessarily small in dimensions or excessively small in some dimensions and exceedingly large in others. The parts may be well proportioned with an object of producing the desired results to the best advantage.

Having described the invention what I claim as new and desire to secure by Letters Patent is:—

A combined driving and steering gear comprising an axle, a yoke thereon, thimbles within the terminal portions of the yoke, a stub shaft, a stub axle, said shaft being journaled within the axle, a yoke extending from the stub axle and embracing the first named yoke, a pivot bolt extending through the terminal portions of the two yokes, said thimbles being adjustable on the pivot bolt, the bolt being revoluble with the yoke of the stub axle, a hub mounted for rotation upon the pivot bolt and bearing against one adjustable by one of the thimbles, a shaft journaled within the first named yoke, gears secured to the respective shafts, said gears being oppositely disposed and the hub being extended between them, and a gear upon the hub and meshing with said shaft gears, said hub adjusting thimble constituting means for holding the gears in mesh.

In testimony that I claim the foregoing as my own, I have hereto affixed my signature in the presence of two witnesses.

FRANK B. HEITMAN.

Witnesses:
J. H. HEITMAN, Jr.,
W. C. BRETZ.